United States Patent
Moline et al.

(10) Patent No.: US 6,987,628 B1
(45) Date of Patent: Jan. 17, 2006

(54) METHOD AND APPARATUS FOR HIGH FLY WRITE DETECTION USING STORED AMPLITUDE VALUES

(75) Inventors: Jerry A. Moline, Denver, CO (US); Bruce Liikanen, Berthoud, CO (US); Julian Lewkowicz, Lafayette, CO (US)

(73) Assignee: Maxtor Corporation, Longmont, CO (US)

( * ) Notice: Subject to any disclaimer, the term of this patent is extended or adjusted under 35 U.S.C. 154(b) by 178 days.

(21) Appl. No.: 09/905,604

(22) Filed: Jul. 13, 2001

Related U.S. Application Data

(63) Continuation-in-part of application No. 09/649,660, filed on Aug. 29, 2000, now Pat. No. 6,678,102.

(60) Provisional application No. 60/217,978, filed on Jul. 13, 2000.

(51) Int. Cl.
*G11B 27/36* (2006.01)

(52) U.S. Cl. .......................... 360/31; 360/60; 360/75; 360/53; 360/46; 360/77.08; 360/67; 360/68; 324/210; 324/212; 324/226

(58) Field of Classification Search ................. 360/31, 360/75, 77.08, 60, 71, 53
See application file for complete search history.

(56) References Cited

U.S. PATENT DOCUMENTS

| | | | | |
|---|---|---|---|---|
| 4,777,544 A | * | 10/1988 | Brown et al. ................. | 360/75 |
| 4,933,783 A | | 6/1990 | Yasui .......................... | 360/67 |
| 5,082,827 A | | 1/1992 | Barnes ......................... | 505/1 |
| 5,130,866 A | | 7/1992 | Klaassen et al. .............. | 360/75 |
| 5,168,413 A | | 12/1992 | Coker et al. ................. | 360/137 |
| 5,339,207 A | | 8/1994 | Moon et al. ................. | 360/77.05 |
| 5,377,058 A | * | 12/1994 | Good et al. ................. | 360/75 |
| 5,410,439 A | * | 4/1995 | Egbert et al. ................ | 360/75 |
| 5,412,519 A | | 5/1995 | Buettner et al. ............. | 360/73.03 |
| 5,446,601 A | | 8/1995 | Fukuta ......................... | 360/46 |
| 5,631,891 A | | 5/1997 | Moritsugu et al. ............ | 369/124 |
| 5,760,983 A | * | 6/1998 | Cowen ......................... | 360/48 |
| 5,831,781 A | * | 11/1998 | Okamura ..................... | 360/31 |
| 5,909,330 A | * | 6/1999 | Carlson et al. ............... | 360/31 |
| 6,014,282 A | * | 1/2000 | Ito .............................. | 360/75 |
| 6,249,393 B1 | * | 6/2001 | Billings et al. ............... | 360/31 |
| 6,266,199 B1 | * | 7/2001 | Gillis et al. .................. | 360/31 |
| 6,268,976 B1 | * | 7/2001 | Carlson et al. ............... | 360/75 |
| 6,411,458 B1 | * | 6/2002 | Billings et al. ............... | 360/75 |
| 6,459,539 B1 | * | 10/2002 | Carlson et al. ............... | 360/31 |

OTHER PUBLICATIONS

Liikanen, et al., U.S. Appl. No. 09/649,660, filed Aug. 29, 2000, entitled "High Fly Write Detection Method".

* cited by examiner

*Primary Examiner*—David Hudspeth
*Assistant Examiner*—Natalia Figueroa
(74) *Attorney, Agent, or Firm*—Tejpal S. Hansra

(57) ABSTRACT

A method and apparatus for detecting a high flying condition of a transducer head in a computer disk drive is provided. The method and apparatus allow the detection of high fly write events that occur over one or a small number of data sectors. In addition, the present invention provides a method and apparatus for detecting high fly write events with a great deal of sensitivity. The method and apparatus of the present invention provide quick response and high sensitivity by monitoring the strength of a signal derived from data written to the disk, and signaling a high fly write event if the monitored signal strength in connection with a particular piece of data is less than a stored high fly write number corresponding to that piece of data by a predetermined amount.

24 Claims, 4 Drawing Sheets

METHOD AND APPARATUS FOR HIGH FLY WRITE DETECTION USING STORED AMPLITUDE VALUES

CROSS-REFERENCE TO RELATED APPLICATIONS

The present application is a continuation-in-part of U.S. patent application Ser. No. 09/649,660, filed Aug. 29, 2000 now U.S. Pat. No. 6,678,102, entitled "HIGH FLY WRITE DETECTION METHOD." Priority is claimed from U.S. patent application Ser. No. 09/649,660 and from U.S. Provisional Patent Application No. 60/217,978, filed Jul. 13, 2000, entitled "HIGH FLY WRITE DETECTION USING AMPLITUDE VALUES IN ERC", which are incorporated herein by reference in their entirety.

FIELD OF THE INVENTION

The present invention relates to the flying height of disk drive transducer heads over the surface of magnetic storage disks. In particular, the present invention relates to the detection of high fly write conditions in a computer disk drive.

BACKGROUND OF THE INVENTION

Computer disk drives store information on magnetic disks. Typically, the information is stored on each disk in concentric tracks, divided into sectors. Information is written to and read from a disk by a transducer head, mounted on an actuator arm capable of moving the transducer head radially over the disk. Accordingly, the movement of the actuator arm allows the transducer head to access different tracks. The disk is rotated by a spindle motor at a high speed, allowing the transducer head to access different sectors on the disk. The transducer head may include separate or integrated read and write heads.

In a typical computer disk drive, the transducer head generally rides above the surface of the disk on a cushion of air that is created by the movement of the disk under the head. The distance of the head from the surface of the magnetic disk is known as the flying height of the transducer head. It is important to maintain the flying height of the transducer head within a desired range. For example, if the transducer head flies at too low a height, it is more likely to come into contact with the magnetic disk causing a loss of stored data. It is also important to ensure that the transducer head does not fly at too great a height. Where the transducer head is at too great a distance from the magnetic disk, the transducer head is said to be in a "high flying" condition. A "high fly write event" occurs when the transducer head suddenly is at too great a height from the disk to reliably perform write operations (i.e., suddenly enters a high flying condition).

Data written to a magnetic storage disk for storage while a transducer head is experiencing a high fly write condition may be lost. This is because the strength of the magnetic field generated by the write head decreases exponentially with distance. Accordingly, where the transducer is at too great a distance from the surface of the magnetic disk (e.g., during a high fly write event), the magnetic field produced may not be strong enough to induce the desired magnetic transitions in the storage disk. Therefore, it is important to detect high flying conditions in a computer disk drive, so that writing to the disk may be delayed until the transducer head has returned to a desired flying height above the surface of the disk.

Previous methods of detecting a high flying condition, including high fly write events, have included monitoring the amplitude of a signal produced in the read head when the read head passes over an automatic gain control (AGC) field on the disk. In general, automatic gain control fields are written to computer disk drive storage disks during manufacturing. AGC fields are usually located in "servo sectors" or "hard sectors," which are areas extending radially across the disk that contain servo positioning information. In general, automatic gain control fields provide a reference magnetic field strength, so that the gain added to read signals by the hard disk drive's channel can be appropriately adjusted.

During the manufacture of a hard disk drive, servo sector information is written to the disk. During this "track writing" procedure, transducer heads having a write head that is about ⅔ the width of a data track are used. Because the AGC fields are the width of an entire data track, each AGC field must be written by at least three passes of the write head. This "stitching" together of the AGC fields causes the AGC fields to be vulnerable to manufacturing defects that result in AGC fields having unevenly spaced magnetic transitions. These unevenly spaced magnetic transitions can in turn result in magnetic fields of uneven strength. These manufacturing defects result in the production of signals in the read head that vary in amplitude. Although the varying magnetic strength of the AGC fields does not prevent them from functioning in connection with their primary gain control function, it does prevent high fly event detection systems dependent upon comparison with a standardized AGC field amplitude from operating with high sensitivity. In addition to defects within individual AGC fields, defects resulting in undesired variations in the magnetic strength of the AGC fields may arise between adjoining AGC fields, where the fields are aligned radially across all or a portion of the disk. Because of these variations between different AGC fields, they cannot be used to detect a change in the flying height of a transducer head from one AGC field to another. This is because a change in the detected amplitude from one AGC field to another could be caused by the above-mentioned manufacturing defects and variations, as well as by a change in the flying height of the transducer head.

Another method of detecting a high fly write event is disclosed by U.S. Pat. No. 5,909,330 to Carlson et al., assigned to the assignee of the present invention. According to Carlson, whether the flying height of a read/write head above a disk is within an acceptable range can be determined by the resolution of a signal read by the read head. In particular, this method relies upon the decrease in the number of detected signal peaks as the flying height of the read head increases.

Another method of detecting a high fly write event is disclosed by U.S. patent application Ser. No. 09/649,660 to Liikanen et al., assigned to the assignee of the present invention, and of which the present application is a continuation in part. According to Liikanen, the average amplitude of the signal derived from a plurality of servo sector position bursts or group of bursts is determined, and is compared to the observed amplitude of a one of the servo sector position bursts or group of bursts. If the comparison indicates that the strength of the observed signal is less than the average amplitude by at least a predetermined amount, a write fault error may be triggered. This method avoids the problems associated with monitoring a signal derived from the AGC fields. In particular, the servo sector position bursts provide a signal having a more consistent amplitude.

Sensitivity is important in detecting high fly write events, because such events are transient in nature. For example, a high fly write event may occur when a transducer head passes over a particle on the surface of the disk. The particle may cause a perturbation in the boundary layer of air supporting the transducer head, causing the head to fly at greater than a desired distance from the disk surface. In a typical high fly event, the transducer head flies at too great a height for one or two sectors of the disk. Therefore, it can be appreciated that detection of a high fly write event preferably is made on the basis of information collected over a single sector of the disk. Furthermore, because the change in height is small, and because the high fly write event may last for extremely short periods of time, it is important that the high fly write detection mechanism be extremely sensitive, so that high fly write events can be detected even at the beginning or end of such an event.

In addition, when a running average value is used as a reference, this method requires charging the algorithm used to develop the average value. Accordingly, such methods may not be suitable for use immediately following a head switch, because they are not able to immediately provide a reference value.

For the above stated reasons, it would be advantageous to provide a method and apparatus for quickly and reliably sensing a high fly write event in a computer disk drive. In addition, it would be advantageous to provide a method and an apparatus for detecting high fly write events that did not adversely affect the performance of the disk drive. Furthermore, it would be advantageous to provide a method and apparatus that can be implemented at an acceptable cost and that are reliable in operation.

SUMMARY OF THE INVENTION

In accordance with the present invention, a method and an apparatus for detecting the flying height of a disk drive transducer head over the surface of a magnetic storage disk are provided. According to the present invention, the strength or amplitude of a signal derived from data written to the magnetic disk is compared to a standard or reference amplitude established for that piece of data to determine whether the transducer head is in a high flying condition. The present invention allows high fly events to be detected even where the transducer head is in a high flying condition for only a very brief period of time.

According to an embodiment of the present invention, the average amplitude of a signal derived from a particular piece of data stored on the disk is determined. This average amplitude is then stored on the disk for use as a standard or reference amplitude. During a write operation, the observed amplitude of the signal derived from the particular piece of data is compared to the stored standard value for that piece of data. If the result of the comparison is unfavorable, a high fly write condition is indicated. Standard or reference amplitudes are established for a plurality of pieces of data. For example, reference amplitudes may be established for a piece of data in or associated with each hard sector or for each data sector on a disk.

In accordance with a further embodiment of the present invention, a marginal value is added to the average amplitudes stored to the disk prior to comparing the resulting standard value to the observed value in order to allow for acceptable variations in flying height due to changes in environmental conditions and drive tolerances. Alternatively, the values stored on the disk may be modified by adding a marginal value before storing the resulting standard values on the disk. In accordance with still another embodiment of the present invention, an undesirable flying height may be indicated if an observed amplitude is outside of a range of amplitudes established on one or both sides of the corresponding stored reference amplitude.

In accordance with an embodiment of the present invention, the data that is read from the magnetic disk to establish reference amplitudes, and that is observed during write operations, is automatic gain control (AGC) data. In accordance with still another embodiment of the present invention, the data that is read in calculating reference amplitudes and that is observed during write operations is servo sector position burst data. In general, any piece of data that can be relied on to exist after the disk drive has been delivered to an end user or after a calibration procedure can be used in connection with the present invention.

In accordance with still another embodiment of the present invention, the reference amplitudes are stored on the disk as part of servo sector data. The servo sector data may be located in a hard sector of the disk, or may be stored in a servo in data sector.

In accordance with one embodiment of the present invention, reference amplitudes are determined and stored on the disk prior to releasing the disk drive to an end user. In accordance with still another embodiment of the present invention, the reference amplitudes may be determined, or re-determined, after delivery of the disk drive to an end user, and those values may then be stored on the disk.

In accordance with an embodiment of the present invention, an average amplitude for use as a reference amplitude is determined and stored on the disk for each AGC field on the disk. Alternatively, average amplitudes may be calculated and stored for less than all of the AGC fields on the disk. As a further alternative, a reference amplitude is determined for a group of servo sector position bursts on the disk.

Based on the foregoing summary, a number of salient features of the present invention are readily discerned. A computer disk drive having the capability of detecting a high flying condition, including high fly write events, and thereby helping to ensure the integrity of data written to a disk, is provided. In particular, a method and an apparatus for detecting high fly write events with great sensitivity are provided. Furthermore, the method and the apparatus of the present invention are operable immediately, including following a head switch.

Additional advantages of the present invention will become readily apparent from the following discussion, particularly when taken together with the accompanying drawings.

DETAILED DESCRIPTION

Figure 1:
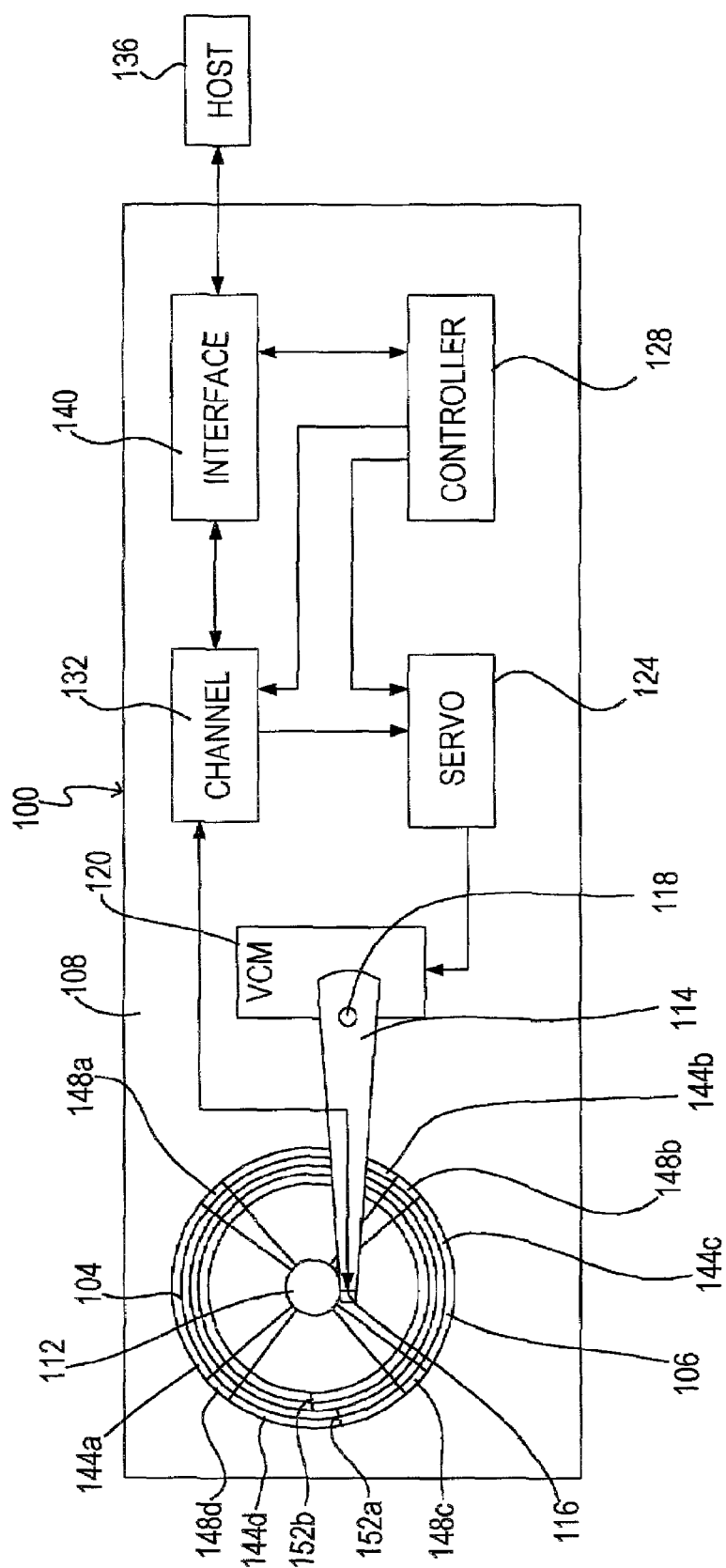
FIG. 1 is a block diagram depicting a disk drive system that can utilize features of the present invention.

With reference now to FIG. 1, the major components of a hard disk drive, generally identified as hard disk drive 100, are illustrated. As shown in FIG. 1, a hard disk drive generally includes a magnetic storage disk 104 rotatably mounted to a base 108 by a spindle bearing 112. Within the spindle bearing 112 is a spindle motor (not shown) for rotating the disk 104 relative to the base 108. An actuator arm 114 has at a first end a transducer head 116. The actuator arm 114 is pivotally interconnected to the base 108 by an actuator arm bearing 118. At a second end, the actuator arm 114 is interconnected to a voice coil motor 120 capable of pivoting the actuator arm 114 about the bearing 118.

The operation of the voice coil motor 120 is controlled by a servo control unit 124, which provides appropriate control signals to the voice coil motor 120. In general, the voice coil motor 120 positions the transducer head 116 over a desired track 106 on the storage disk 104.

A controller 128 provides information to the servo control unit 124 regarding the desired or target track 106. The controller 128 additionally provides timing information to the channel 132. The channel 132 is operative for processing data flowing between a host computer 136 and the disk 104. The interface 140 is operative for managing the flow of data between the host unit 136 and the disk drive 100, and receives commands from the host 136 for delivery to the controller 128.

The tracks 106 are divided into a plurality of data sectors 144a–d and a plurality of servo sectors 148a–d. A plurality of zones 152a–b may be formed from groupings of tracks 106. As shown in FIG. 1, the servo sectors 148 may extend radially across the disk 104 in the form of wedges or spokes. However, it should be appreciated that the servo sectors may be more numerous toward the outer circumference of the disk 104, and less numerous toward the inner circumference of the disk, for instance, where zone density recording techniques are used to increase the storage capacity of the disk 104.

As an example of the operation of the disk drive 100, in response to a digital signal from the host computer 136 to write data to the disk 104, the channel 132 processes the signal from the host computer 136 and converts it to a variable write current signal that is delivered to the transducer head 116. The actuator arm 114 carries the transducer head 116 and positions the head 116 above the target track 106. In particular, the voice coil motor 120 moves the actuator arm 114 to position the transducer head 116 above the target track 106. The voice coil motor 120 is responsive to a servo control signal from the servo control unit 124.

During a read operation, the controller 128 receives (via the interface 140) a request from the host 136 for a particular piece of information stored on the disk 104. The controller 128 issues a control signal to the servo control unit 124, which in turn actuates the voice coil motor 120 to position the transducer head 116 over the target track 106. After the transducer head 116 is in position, data from the track 106 is read by the transducer head 116, and the resulting signal passed to the channel 132. Channel 132 receives the analog read signal provided by the transducer head 116, and converts that signal into a digital signal that can be understood by the host 136.

Figure 2:
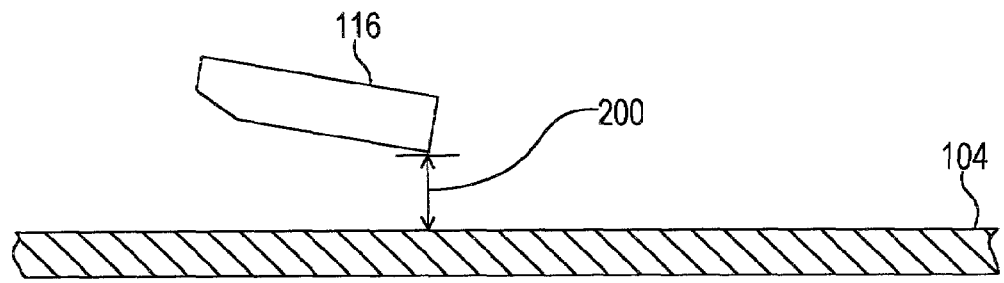
FIG. 2 is a representation of a sectional view of a disk and an associated transducer head illustrating the flying height of the transducer head above the disk surface.

With reference now to FIG. 2, a representation of a sectional view of a storage disk 104 and transducer head 116 is illustrated. As shown in FIG. 2, during operation, the head 116 (which, as illustrated, includes a slider) is raised above the surface of the disk 104 by a spacing 200 known as the flying height of the head 116. The spacing or flying height 200 is created by the interaction between air currents above the surface of the disk 104 caused by the rotation of the disk 104 and the aerodynamic qualities of the slider of the transducer head 116.

Figure 3:
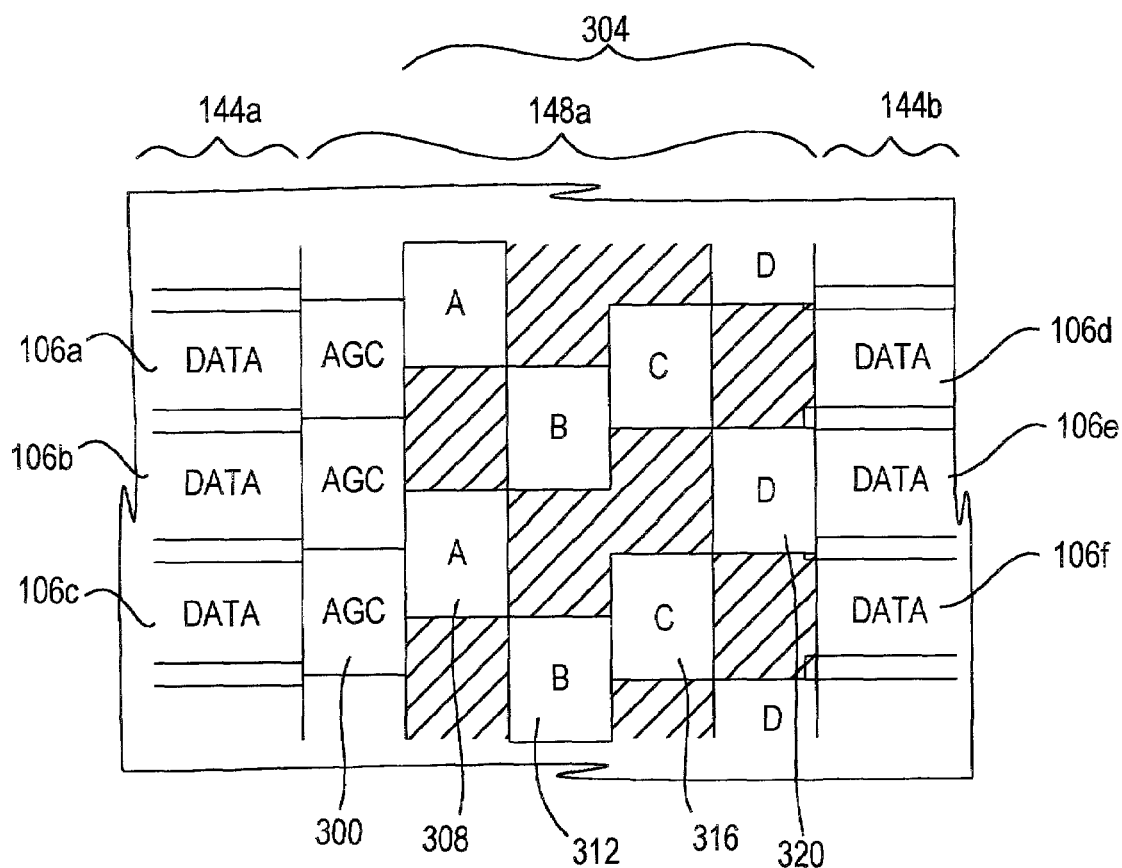
FIG. 3 is a schematic illustration of an arrangement of information on a magnetic storage disk according to one embodiment of the present invention.

With reference now to FIG. 3, the informational content of a portion of a disk 104 surface in a typical disk drive 100 is illustrated. As illustrated in FIG. 3, the disk 104 includes data sectors 144a and 144b separated by a servo sector 148a containing positioning information. In a typical disk drive, a plurality of servo sectors 148 extend radially across the surface of the disk 104 to divide it into a plurality of data regions. As will be appreciated by one skilled in the art, more than one data sector 144 may be positioned between two servo sectors 148. Therefore, the number of data sectors 144 on a disk 104 is often greater than the number of servo sectors 148. The data sectors 144a and 144b are, for illustration purposes, shown with three tracks 106a, 106b and 106c in the first data sector 144a, and three data tracks 106d, 106e and 106f in the second data sector 144b. However, it will be appreciated that, in a typical disk drive, there may be thousands of data tracks 106 concentrically arrayed across the disk 104, each divided into well over one-hundred sectors.

With continued reference to FIG. 3, the servo sector 148a is shown to include a plurality of automatic gain control (AGC) fields 300. The AGC fields 300 extend across the disk 104 radially, from an inside diameter to an outside diameter of the disk 104. In FIG. 3, the AGC fields 300 are shown to extend across the disk 104 in continuous lines, although this need not be the case. Generally, each AGC field 300 contains a signal of a calibrated strength. As the transducer head 116 passes over the AGC field 300, the strength of the signal passed through the channel 132 is monitored. This signal strength is used to adjust the gain imparted to signals read by the transducer head 116. Generally, at least after an initial adjustment to the gain of the channel 132 has been made, adjustments to the amount of gain are made gradually. In part, this is because the amplitude of a single AGC field 300 cannot be precisely controlled. In addition, allowing rapid changes to the amount of gain in the channel 132 would interfere with the accurate detection of high fly events according to the present invention. Therefore, it is preferable to prevent rapid changes to the gain imparted to read signals by the channel 132 after an initial amount of gain has been set.

Also illustrated in FIG. 3 is a servo sector position information region 304 having servo sector position bursts A 308, B 312, C 316 and D 320. In a typical disk drive 100, the servo sector position bursts 308–320 are used to enable the transducer head 116 to be precisely positioned over the center of a target data track 106. The servo sector position bursts 308–320 may, in addition to the configuration illustrated in FIG. 3, be arranged in alternative patterns. In addition, a lesser or greater number of servo sector position bursts 308–320 may be provided in connection with a particular sector 148 of a particular track 106. For example, only A 308 and B 312 servo sector position bursts may be provided.

Although the AGC fields 300 are shown in FIG. 3 as belonging to the servo sector 148, this is not required. For example, the AGC fields 300 may be written to some or all of the data sectors 144 as part of a servo-in-data sector by the transducer head 116 of the disk drive 100. In general, a servo-in-data sector may contain any data for which the information content is not critically dependent on the physical location of the data on the disk. For example, an AGC filed 300 can be located at some distance from the data for which the gain in the channel 132 is set using that AGC field. In contrast, a servo sector position burst 308, 312, 316 or 320 is used to determine the position of the transducer head 116 relative to the track 106 being followed, and therefore the information it provides is critically dependent on the physical location of servo sector position burst 308, 312, 316 or 320. Writing the AGC fields 300 to data sectors 144 as part of servo-in-data sectors reduces the amount of time that is required by a servo track writer to prepare a disk 104 for inclusion in a disk drive 100, because servo-in-data may be written by the transducer head 116. In addition, servo data, including AGC fields, written to data sectors as part of servo in data fields can be re-written after delivery of the drive to an end user if recalibration of the drive is required. Other servo data that can be stored in a servo in data field includes embedded runout correction (ERC) values, and reference amplitudes for use in connection with the detection of high flying conditions, as will be explained in greater detail below.

Although data stored in servo-in-data sectors can generally be understood to be data providing information that is not critically dependent on the physical location of the data, it should be noted that any data, such as an AGC field, used in connection with determining the flying height 200 of a transducer head 116 should be located adjacent or in close proximity to the data sector for which the flying height 200 is being assessed. For a complete explanation of servo-in-data sectors, see U.S. patent application Ser. No. 09/454,125, filed Dec. 3, 1999, the entire disclosure of which is incorporated by reference herein in its entirety.

According to the present invention, the amplitude of a signal derived from data, such as an AGC field, associated with one or more data sectors 144 is monitored in the channel 132. Because the amplitude of a signal derived from data written to a disk 104 varies with the flying height 200 of the transducer head 116, the amplitude of the detected signal is indicative of the flying height 200 of the transducer head 116. Therefore, generally stated, the present invention compares the amplitude of a signal derived from a particular piece of data to a standard amplitude established for that piece of data. Accordingly, the data used to monitor the flying height 200 of the transducer head 116 must not be altered during normal operation of the disk drive 100. That is, the data used in connection with monitoring the flying height 200 of the transducer head 116 should be servo data, whether that data is stored in a servo sector 148, or is part of a servo in data sector stored in a data sector 144 portion of the disk 104. It should be appreciated that, as used herein, servo data refers to data that is not altered during normal operation of the disk drive 100, whether or not such data is written to the disk 104 by a servo track writer, or by the transducer head 116 of the disk drive 100 during calibration of the disk drive 100. Accordingly, data that may be used in connection with monitoring the flying height 200 of a transducer head 116 over a disk 104 includes AGC fields 300, servo sector position bursts 308–320, or ERC values.

Figure 4:
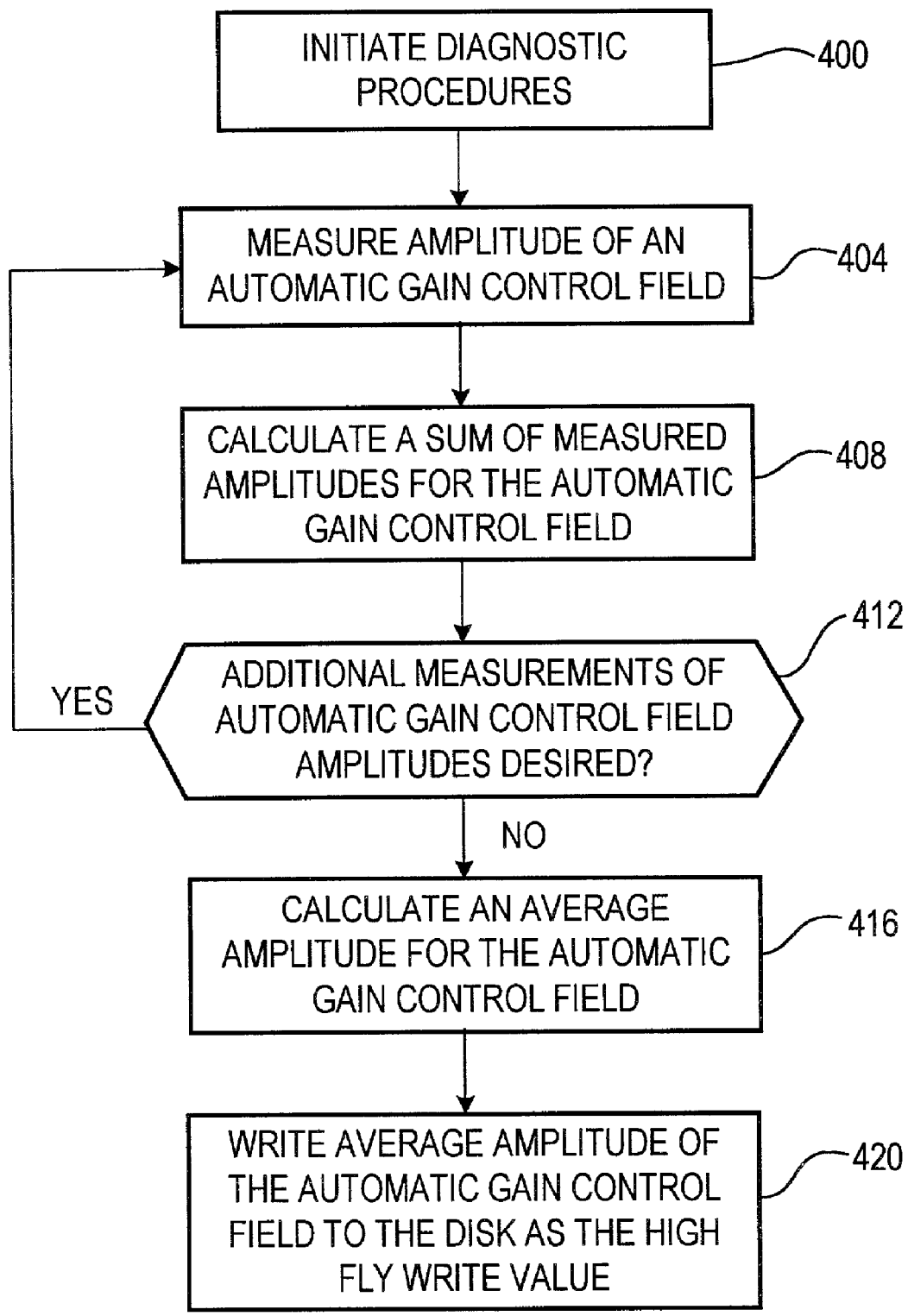
FIG. 4 is a flow chart depicting the development of reference amplitude values in accordance with an embodiment of the present invention.

With reference now to FIG. 4, a flow chart illustrating the development of reference amplitude values in accordance with one embodiment of the present invention is shown. Initially, at step 400, diagnostic procedures are initiated. In addition to the determination of reference amplitudes as described below, the diagnostic procedures may include flaw scan detection and the determination of embedded runout correction values. As can be appreciated, the diagnostic procedures are performed after assembly of the disk drive 100. Accordingly, the determination of reference amplitudes can be accomplished during post assembly procedures, and without requiring the use of a servo track writer.

At step 404, the amplitude of an automatic gain control field 300 is determined. Each time the amplitude of an AGC field 300 is measured, that value is added to any previously measured amplitude or amplitudes for that field so that a sum is calculated (step 408). Accordingly, if a measured amplitude for a particular automatic gain control field 300 is the first measurement with respect to that AGC field 300, the sum is simply the measured amplitude.

At step 412, a determination is made as to whether additional measurements of the automatic gain control field 300 amplitude are desired. The number of measurements that are taken may be set in the firmware of the disk drive 100 or may be selected by a user. If additional measurements are indicated, the system returns to step 404 to take an additional measurement. At step 408, the additional measurement is added to any previous measurements of the amplitude of the signal derived from that AGC field 300.

If it is determined at step 412 that no additional measurements of the amplitude of the AGC field 300 are indicated, the system proceeds to calculate an average amplitude for the automatic gain control field 300 (step 416). As can be appreciated by one of skill in the art, the greater the number of individual measurements of an AGC field's amplitude used to construct an average, the more the effects of noise and other random influences on the measured amplitude are suppressed. At step 420, the average amplitude for the automatic gain control field is written to the disk as a high fly write value for the data sector 144 associated with the AGC field 300. For example, the high fly write value is written to a servo in data sector containing other data associated with that data sector 144, such as embedded runout correction data.

As can be appreciated, the above-described embodiment of the present invention can be implemented such that high fly write values may be calculated for a plurality of data sectors in parallel. For instance, the amplitude of signals derived from all of the AGC fields 300 in a track 106 on a disk 104 may be collected in series as the transducer head 116 traverses over the AGC fields 300. From multiple passes over the AGC fields 300, an average amplitude for each of the AGC fields 300 may be calculated.

Figure 5:
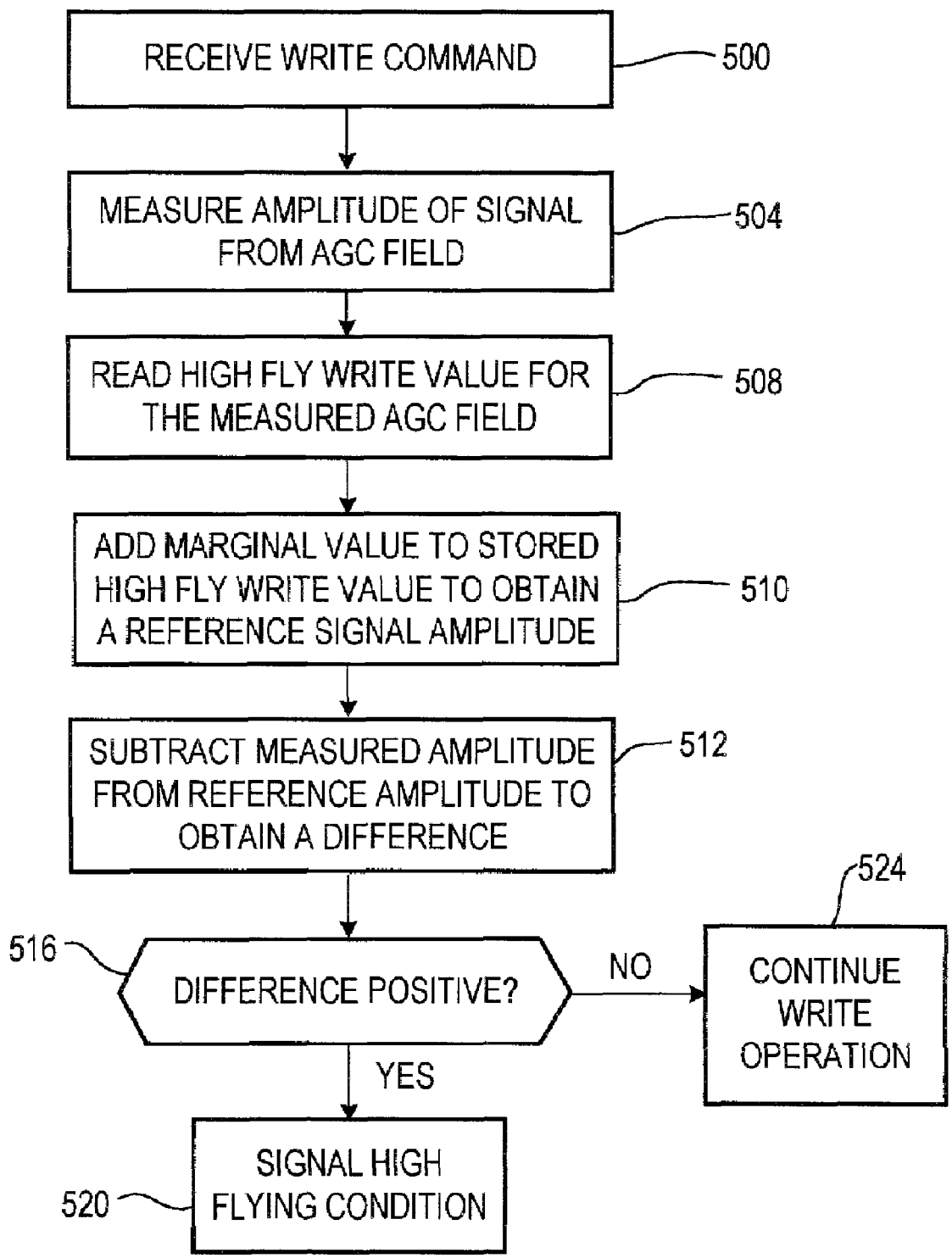
FIG. 5 is a flow chart depicting the operation of a system in accordance with an embodiment of the present invention.

FIG. 5 is a flow chart depicting the operation of a system in accordance with an embodiment of the present invention. In particular, FIG. 5 illustrates the detection of a high fly write condition after a high fly write value for data associated with all or a plurality of the data sectors 144 on a disk 104 have been determined, such as described above in connection with FIG. 4. Initially, at step 500, a write command is received, for example from the host computer 136. At step 504, the amplitude of a signal derived from the AGC field 300 associated with the data sector 144 to which the data will be written is measured.

At step 508, the high fly write value determined for the AGC field 300 is read from the disk 104. At step 510, a marginal value is added to the high fly write value to obtain a reference signal amplitude. In general, the marginal value is set to allow for variations in the amplitude of the signal from the AGC field 300 that are not severe enough to signal the occurrence of a high fly write condition. For example, noise in the channel 132 may cause some variance in the amplitude of the signal that is not indicative of a high fly write condition. In addition, where, for example, the disk drive 100 is calibrated in an environment having a higher pressure and/or a lower temperature than the environment in which the write operation is to be performed, the signal amplitude can be expected to be lower than the high fly write number. Therefore, the marginal value should be large enough to allow for variations in signal amplitude due to operation of the disk drive 100 at a range of pressures and temperatures that are within the normal operating parameters of the disk drive 100. For purposes of illustration, the high fly write value may be 100 mV, the marginal value may be 20 mV, and the measured value may be 130 mV.

At step 512, the measured amplitude is subtracted from the reference amplitude to obtain a difference. Next, a determination is made as to whether that difference is positive (step 516). If the difference is positive, a high flying condition is signaled (step 520). In response to a high flying condition signal, the disk drive 100 may take various measures. For example, a second attempt to repeat the write operation may be made. If a high flying condition is again signaled during the additional attempt, the transducer head 116 may be vibrated or burnished in an attempt to remove any particles from the transducer head 116 that may be causing the high flying condition to occur.

If the difference is negative, the write operation is continued (step 524). In other words, a high fly write condition does not exist. With respect to the example values noted above, the difference is negative (i.e. is not positive), indicating a flying height that is not excessive.

As can be appreciated, the above-described embodiment of the present invention stores a reference or high fly write value corresponding to all or a selected plurality of AGC fields 300 present on the disk 104. During write operations, the amplitude of a signal derived from an AGC field 300 associated with one or more of the data sectors 144 to which the data will be written is monitored. The amplitude of the AGC field 300 is compared to a high fly write value that has been previously calculated for that particular AGC field 300. As described above, a marginal value may be added to the high fly write value to allow for slight variations in the flying height 200, such as may occur during normal operation of the disk drive 100. Because a separate high fly write value is determined and stored for each AGC field that will be monitored, the present invention is able to function even if the amplitudes of those AGC fields 300 differ from one another due to manufacturing variations or defects. Additionally, because the measured amplitude for an AGC filed 300 is not compared to an average derived from a plurality of AGC fields, allowed variations from the high fly write number established for a particular AGC field 300 may be relatively small, without impeding the performance of the disk drive 100 by requiring numerous rewrite attempts and procedures designed to remove particles from the transducer head 116.

Although the embodiment described in the examples above discusses the use of AGC fields 300 in connection with detection of a high flying condition, any data that is not altered during the normal operation of the disk drive 100 may be used. For example, the amplitude of ERC values or the amplitude of a signal derived from servo sector position bursts in sector preambles may be used. Of course, the high fly write value should be derived from the same data (e.g., the servo sector position bursts) that is later monitored in connection with the detection of high fly write events.

According to still another embodiment of the present invention, a marginal value is added to the high fly write number before that number is stored on the disk 104. According to still another embodiment of the present invention, the marginal value added to the high fly write number may be varied according to the environmental conditions in which the disk drive 100 is operated, or according to a desired sensitivity to high fly write events.

According to the present invention, a method and an apparatus for detecting high flying conditions in a computer disk drive are provided. In particular, the present invention discloses a method and an apparatus for detecting high fly write events with great sensitivity, effectively protecting against data loss that may occur in connection with high flying conditions, including high fly write events, but without unduly limiting the data throughput performance of the disk drive. According to the present invention, the amplitude of a signal derived from data written to a disk 104 is compared to a reference or high fly write number derived from that data. Where the observed signal strength or amplitude is less than the amplitude indicated by the high fly write number by at least a predetermined amount, a high flying condition is indicated. In response to the indication of the high fly condition, the disk drive may prohibit subsequent write operations for a period of time.

In the embodiment discussed in connection with FIG. 5, the amplitude of a piece of data is measured before that amplitude is compared to the reference amplitude for that piece of data. It will be appreciated by one of skill in the art that these steps may be reversed, such that the reference amplitude is read prior to measuring the amplitude. Such an embodiment may allow the monitored piece of data to be located in close proximity to the data sector with respect to which the write operation is to occur.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for detecting a high flying condition in a disk drive, comprising:
   providing a disk surface having a track, said track including a plurality of AGC fields each corresponding with at least one data sector in said track;
   measuring an amplitude associated with each of said plurality of AGC fields, said amplitudes corresponding to flying heights of a transducer head over the disk surface at locations corresponding to said plurality of AGC fields;
   storing values corresponding with said measured amplitudes onto said disk surface;
   prior to writing data to a data sector in said track, measuring an amplitude associated with the AGC field that corresponds with said data sector and comparing said measured amplitude to a stored value corresponding to the AGC field; and
   generating a signal indicating a high flying condition if said comparison is unfavorable.

2. The method of claim 1, wherein said stored value comprises a reference value.

3. The method of claim 2, wherein said reference value is derived from information stored on said disk.

4. The method of claim 1, wherein said stored value comprises a reference value plus a marginal value.

5. The method of claim 1, wherein said stored value is stored on said disk surface in a servo sector associated with the AGC field.

6. The method of claim 1, wherein said stored value is stored on said disk surface in a servo in data sector associated with the AGC field.

7. The method of claim 1, wherein said stored value is stored on said disk surface in a data sector associated with the AGC field.

8. The method of claim 1, wherein said comparison is unfavorable if said measured value is less than said stored value.

9. The method of claim 1, wherein said stored value encodes a numerical value.

10. The disk drive of claim 1, wherein a plurality of amplitudes associated with each of said plurality of AGC fields are measured and said stored values corresponding with said measured amplitudes represent an average value associated with each of the plurality of AGC fields.

11. The disk drive of claim 1, wherein amplitudes are measured for all of the AGC fields in said track.

12. The disk drive of claim 1, wherein amplitudes are measured for all of the AGC fields on the disk surface.

13. A method for detecting whether a flying height of a transducer head over a disk surface in a disk drive exceeds a desired amount, said disk surface having a track, said track including a plurality of AGC fields each corresponding with at least one data sector in said track, said method comprising the steps of:

determining standard transducer head flying height numbers, wherein said standard transducer head flying height numbers are based on measured amplitudes associated with each of said plurality of AGC fields;

storing said standard transducer head flying height numbers on said disk surface;

prior to writing data to a data sector in said track, determining an amplitude associated with the AGC field associated with said data sector to obtain an observed transducer head flying height number;

comparing said selected standard transducer head flying height number associated with said AGC field to said observed transducer head flying height number; and signaling a high fly write condition if said comparison indicates a high fly write event.

14. The method of claim 13, wherein said step of determining standard transducer head flying height numbers comprises setting said measured amplitudes equal to said standard transducer head flying height numbers.

15. The method of claim 13, wherein said step of determining standard transducer head flying height numbers comprises:

adding a marginal value to said measured amplitudes to obtain said standard transducer head flying height numbers.

16. The method of claim 13, wherein said step of storing said transducer head flying height numbers to said disk surface comprises storing said numbers in servo sectors of said disk surface.

17. The method of claim 13, wherein said step of storing said transducer head flying height numbers to said disk surface comprises storing said numbers in data sectors of said disk surface.

18. The method of claim 17, wherein said data sectors are located in customer data regions of said disk surface.

19. The method of claim 13, wherein said step of determining standard transducer head flying height numbers is performed prior to delivery of said disk drive to an end user.

20. The method of claim 13, wherein said step of determining standard transducer head flying height numbers is performed prior to storing customer data on said disk.

21. The method of claim 13, wherein said step of comparing comprises subtracting said observed transducer head flying height number from said standard transducer head flying height number.

22. The method of claim 13, wherein a high fly write event is indicated if said step of comparing results in a number that is positive.

23. A method for detecting a high flying condition in a disk drive, comprising:

providing a disk surface having a track, said track including a plurality of groups of servo bursts each corresponding with at least one data sector in said track;

measuring an amplitude associated with each of said plurality of groups of servo bursts, said amplitudes corresponding to flying heights of a transducer head over the disk surface at locations corresponding to said plurality of groups of servo bursts;

storing values corresponding with said measured amplitudes onto said disk surface; and prior to writing data to a data sector in said track, measuring an amplitude associated with the group of servo bursts that correspond with said data sector and comparing said measured amplitude to a stored value corresponding to the group of servo bursts.

24. A method for detecting a high flying condition in a disk drive, comprising:

providing a disk surface having a track, said track including a plurality of ERC fields each corresponding with at least one data sector in said track;

measuring an amplitude associated with each of said plurality of ERC fields, said amplitudes corresponding to flying heights of a transducer head over the disk surface at locations corresponding to said plurality of ERC fields;

storing values corresponding with said measured amplitudes onto said disk surface; and prior to writing data to a data sector in said track, measuring an amplitude associated with the ERC field that corresponds with said data sector and comparing said measured amplitude to a stored value corresponding to the ERC field.

* * * * *